United States Patent [19]

Werner

[11] Patent Number: 4,661,751
[45] Date of Patent: Apr. 28, 1987

[54] WELL PUMP CONTROL SYSTEM

[75] Inventor: John W. Werner, Lubbock, Tex.

[73] Assignee: Claude C. Freeman, Lubbock, Tex.

[21] Appl. No.: 658,500

[22] Filed: Oct. 9, 1984

Related U.S. Application Data

[63] Continuation-in-part of Ser. No. 398,085, Jul. 14, 1982, Pat. No. 4,476,418.

[51] Int. Cl.$^4$ .................... H02P 5/00; F04B 49/00
[52] U.S. Cl. .................... 318/332; 318/474; 417/12; 417/53; 73/151
[58] Field of Search ............... 318/177, 127, 332, 341, 318/415, 432, 443, 444, 452, 481, 463–466, 474, 503, 470, 482, 488, 645, 798, 806; 417/2, 12, 40, 44, 53, 415; 73/151

[56] References Cited

U.S. PATENT DOCUMENTS

| | | | |
|---|---|---|---|
| 2,947,931 | 8/1960 | Hubby | 318/474 X |
| 3,269,320 | 8/1966 | Tilley et al. | 417/12 |
| 3,274,940 | 9/1966 | Cottrell | 417/12 X |
| 3,765,234 | 10/1973 | Sievert | 73/151 |
| 3,824,851 | 7/1974 | Hagar et al. | 73/151 |
| 3,957,395 | 5/1976 | Ensign | 417/53 X |
| 4,145,161 | 3/1979 | Skinner | 417/53 X |
| 4,220,440 | 9/1980 | Taylor et al. | 417/12 |
| 4,284,943 | 8/1981 | Rowe | 318/806 |
| 4,286,925 | 9/1981 | Standish | 417/12 |
| 4,390,321 | 6/1983 | Langlois et al. | 417/53 X |
| 4,483,188 | 11/1984 | McTamaney et al. | 417/53 X |
| 4,541,274 | 9/1985 | Purcupile | 73/151 |

Primary Examiner—William M. Shoop, Jr.
Assistant Examiner—Shik Luen Paul Ip
Attorney, Agent, or Firm—Hubbard, Thurman, Turner & Tucker

[57] ABSTRACT

A well pump control system is disclosed for utilization with a conventional well pump having a stationary member and a reciprocating member. The reciprocating member operates a down-hole pump and is attached to a rocking beam through a load cell. The rocking beam is driven by an electric motor through a counterbalanced crank. The strain present on the reciprocating member as detected by the load cell is utilized to operate a variable frequency drive unit which acts to control the frequency of the voltage applied to the electric motor. In this manner, the speed of the motor may be selectively and gradually varied during the pump cycle to both minimize power consumption and increase slip during heavy loading. Additionally, the maximum amount of strain present on the reciprocating member can be controlled throughout the entire cycle to minimize maintenance costs associated with excessive strain.

3 Claims, 2 Drawing Figures

WELL PUMP CONTROL SYSTEM

CROSS-REFERENCE TO RELATED PATENTS

This application is a continuation-in-part of application Ser. No. 398,085, filed July 14, 1982, and now U.S. Pat. No. 4,476,418.

BACKGROUND OF THE INVENTION

This invention relates in general to control systems for utilization with well pumps and in particular to control systems which vary the speed of the driving motor during each cycle of the well pump.

In the prior art it is known to utilize well pump control systems which remove power from the motive force for long periods of time to avoid operating the well pump when no oil is present in the underground pool. Such systems generally operate based upon the flow rate of oil from the well and are necessary to avoid a condition known as "fluid pound" which occurs when the pump plunger compresses expanded gases in the top of the chamber above the pump and the pump contacts the surface of the liquid in a sudden manner. This condition causes vibration and oscillation which may be destructive to the pump and production tubing.

As important as the avoidance of "fluid pound" is the avoidance of sudden vibration and oscillation which occurs as the reciprocating member in the well pump is suddenly lifted from the bottom of each stroke when fluid is present is very significant as is "pump off". The substantially incompressible nature of the fluids involved and the inertia which must be overcome at the beginning of each stroke of the pump create a sudden and substantial strain on the well pumping equipment. To compensate for the wear on well pump equipment and to increase the operability of electric motors utilized with such pumps, it is common to design electric motors which are to be utilized in well pumps with a high amount of "slip" capability. This slip is the amount of slip from synchronous motor speed that occurs as the motor attempts to overcome the weight of the fluid column on top of the pump at the beginning of each stroke. This slip generates high currents and great heat and it is quite expensive to design an electric motor to permit such slip. Additionally, the high current peaks generated during such slip operation and the fact that the motor is substantially unloaded during each downstroke causes a poor power factor and an attendant increase in operating costs.

Recently the aforementioned U.S. application Ser. No. 398,085, and now U.S. Pat. No. 4,476,418, by the inventor herein, proposed a system which removes electrical power from a standard drive motor for a selected period of time during each cycle to let the reciprocating member "coast" until its inertia has been overcome to a selected point. A tachometer is utilized to measure the speed of the motor while it is coasting and to couple electrical power back to the motor at a selected point during each cycle. While this novel control system does permit such a system to operate more efficiently without the necessity for high slip motors, the strain on the reciprocating member cannot be effectively controlled utilizing this system.

SUMMARY OF THE INVENTION

It is therefore one object of the present invention to provide an improved well pump control system.

It is another object of the present invention to provide an improved well pump electric motor control system which improves power factor and permits large amounts of "slip".

It is yet another object of the present invention to provide an improved well pump electric motor control system which reduces peak current demand.

It is another object of the present invention to provide an improved well pump electric motor control system which may be easily and inexpensively installed on existing well pump equipment.

The foregoing objects are achieved as is now described. A conventional wall pump is provided having a stationary member and a reciprocating member. The reciprocating member operates a down-hole pump and is attached to a rocking beam through a load cell. The rocking beam is driven by an electric motor through a counterbalanced crank. The strain present on the reciprocating member as detected by the load cell is utilized to operate a variable frequency drive unit which acts to control the frequency of the voltage applied to the electric motor. In this manner, the speed of the motor may be selectively and gradually varied during the pump cycle to both minimize power consumption and increase slip during heavy loading. Additionally, the maximum amount of strain present on the reciprocating member can be controlled throughout the entire cycle to minimize maintenance costs associated with excessive strain.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
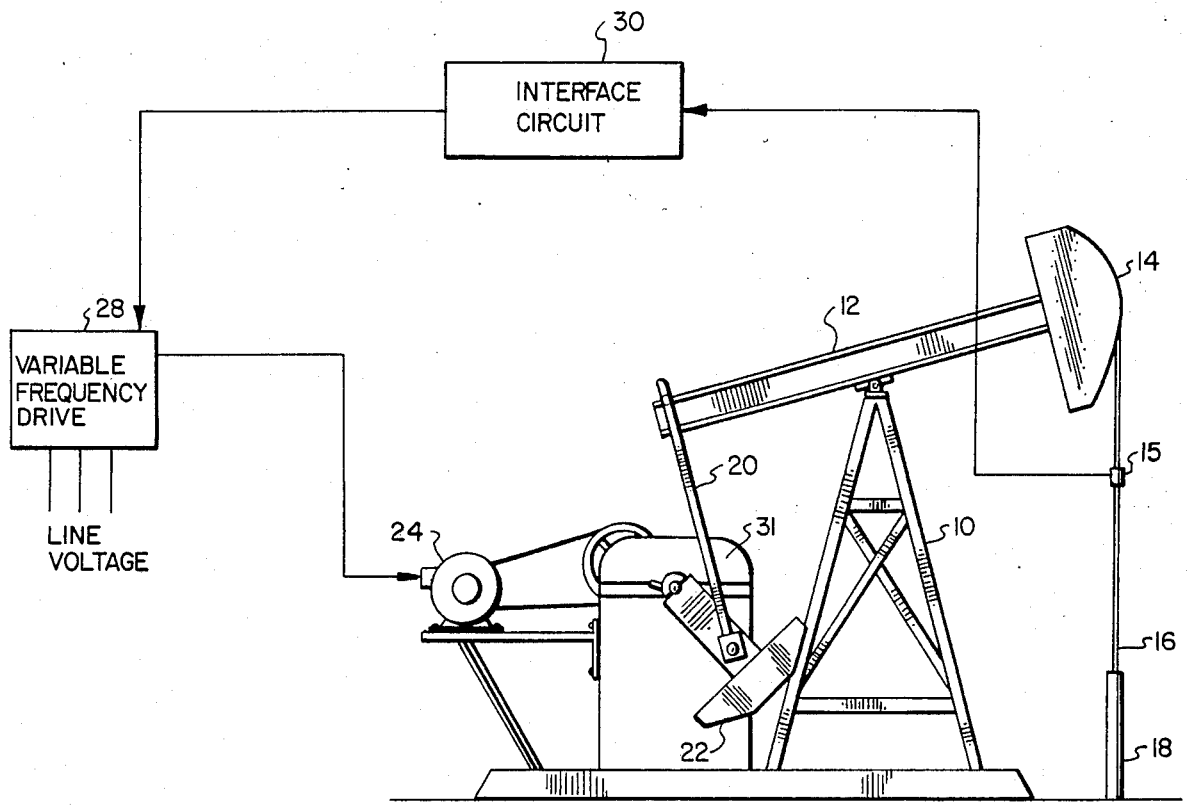
FIG. 1 is a partially schematic, partially diagrammatic view of the novel well pump control system of the present invention.

With reference now to the figures, and in particular with reference to FIG. 1 there is depicted a partially schematic, partially diagrammatic view of the novel well pump control system of the present invention. Many of the components depicted in FIG. 1 are standard well pump operating components and those skilled in the art will appreciate, upon reference to FIG. 1, that the novel well pump control system of the present invention may be easily and inexpensively added to existing well pump equipment.

A conventional well pump is depicted in FIG. 1, including a support member 10 which supports a pivotally mounted rocking beam 12. Rocking beam 12 includes horsehead 14 which is attached to a reciprocating rod 16 through a load cell 15. Load cell 15 is preferably a 0-30K pound load cell such as the load cell manufactured by Interface Inc. Load cell 15 puts out a voltage signal which is proportional to the load on load cell 15 at any particular time. Rod 16 is utilized to operate a down-hole pump (not shown) through reciprocating motion with respect to tubing 18, in a manner well known in the art. The opposite end of rocking bram 12 is coupled, via connecting rod 20, to counterbalanced crank 22. Again, as is well known in the art, counterbalanced crank 22 is driven through a series of gears and/or belts by electric motor 24. Such systems are generally balanced in what is called the "rod heavy" mode, and if allowed to coast, will come to rest in a position with rod 16 at its lowest point and counterbalanced crank 22 at its uppermost or "twelve o'clock" position.

As counterbalanced crank 22 is driven clockwise past the "twelve o'clock" position by a combination of its own momentum and electric motor 24, rod 16 is lifted up out of the well, lifting fluid from the well bore and increasing the load on load cell 15. It is this sudden lifting and accompanying increase in motor load which cause electric motor 24 to "slip" from synchronous speed in known systems. Those skilled in the art will appreciate that if motor 24 is not permitted to slip, the sudden increase in load present when rod 16 is lifted will cause undue loading and strain on the mechanical components of the well pump.

A novel feature of the well pump control system of the present invention is the manner in which electric motor 24 is allowed to slow from synchronous motor speed without the necessity of designing electric motor 24 to withstand the high current peaks and wear associated with such slippage. As discussed above, if rocking beam 12 is allowed to settle, rod 16 will drop to its lowest position with respect to tubing 18. This dropping of rod 16 will begin shortly after counterbalanced crank 22 has passed the "six o'clock" position in its clockwise rotation. The stress on the rod during rod return varies with the viscosity and density of the fluid through which the pump piston passes. Thus, the stress will vary from a normal stress for the fluid as the physical properties of the fluid change during pump operation. The load cell 15 will generate electrical signals indicative of the rod strain resulting from the stress encountered during the rod return portion of the stroke. Further, after rod 16 has dropped to its lowest position and horsehead 14 begins to rise, load cell 15 positioned between horsehead 14 and rod 16 will begin to generate an electrical signal indicating an increase in load or strain present at that point in the system. This signal is preferably a small direct current voltage on the order of zero to twenty millivolts and it is coupled to interface circuit 30. Interface circuit 30 is a circuit designed to generate a proportional current output in response to the application of a direct current voltage from load cell 15. The direct current output from interface circuit 30 is then coupled to variable frequency drive 28. Variable frequency drive 28 is preferably a standard variable frequency drive such as may be manufactured by General Electric Incorporated or Toshiba Incorporated and preferably generates 480 volts AC from zero to ninety hertz. As the strain present on rod 16 increases, as indicated by an increase in voltage from load cell 15, interface circuit 30 operates in conjunction with variable frequency drive 28 to slow the operation of motor 24. As motor 24 slows, the movement of rod 16 will slow and the strain present at load cell fifteen will decrease. Those ordinarily skilled in the art will appreciate that interface circuit 30 may be designed to implement a desired maximum strain at the point of load cell 15 by varying the frequency of voltage output from variable frequency drive 28 more or less rapidly in response to the output of load cell 15. Thus, the system described herein may be utilized to measure the rate of increase in stress and adjust motor speed smoothly and the rod responsive to the rate of travel generates a maximum strain which will be present on rod 16 at any point throughout operation of the system for measurement by the load cell. In this manner, the maintenance of the system may be significantly decreased by decreasing the sudden massive increase (rate of increase) in strain present on rod 16 during the initial portions of a fluid lift.

Figure 2:
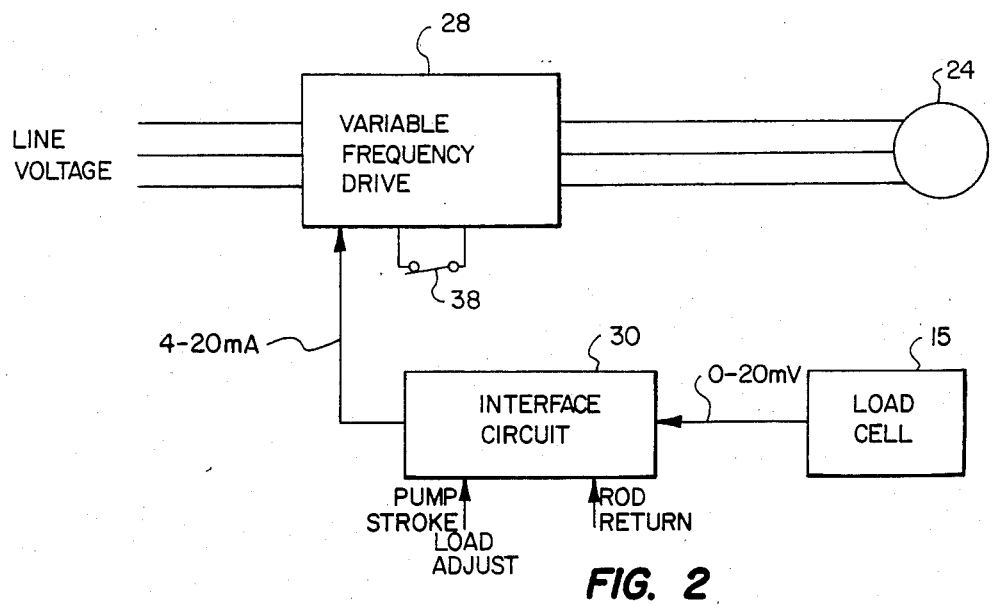
FIG. 2 is a schematic view of the novel well pump motor control system of the present invention.

Referring now to FIG. 2, there is depicted a schematic diagram of the well pump control system of the present invention. Where possible, the reference numerals utilized in FIG. 2 are identical to the reference numerals utilized for similar components in FIG. 1. As may be seen in FIG. 2, electric motor 24 is connected to a line supply voltage through variable frequency drive 28. A switch 38 is utilized to energize variable frequency drive 28 and to being operation of the system. Load cell 15, placed at the interface between rod 16 and horsehead 14, generates a zero to twenty millivolt direct current voltage which is proportional to the load present on load cell 15 at any given moment driving the operation cycle which includes a rod return portion and a pump stroke portion. Interface circuit 30 converts this direct current voltage to a four-twenty milliamp direct current output, utilizing circuitry well known in the electronic art, and applies this current to variable frequency drive 28 to vary the frequency of the electrical voltage applied to motor 24. As may be seen in FIG. 2, interface circuit 30 includes means for setting a maximum load permitted during pumpstroke and during rod return by means of load adjust inputs. The means for setting the maximum load permitted during the pump stroke cycle portion provides a load adjust signal which is a selected safe maximum permittable signal for continuous comparison with the actual stress signals produced by the load cell, and during the rod return cycle portion to means provides a rod return signal which is a reference signal indicative of the stress on the rod during dropping through normal fluid conditions for comparison with the actual stress on the rod during dropping through the fluid as measured by the load cell. In this manner, the maximum strain present on rod 16 during both rod return and pumpstroke may be simply and easily entered into interface circuit 30 as dc signals and, varying the output of interface circuit 30 in proportion to the adjusted input from load cell 15, the resultant signal may be utilized by the variable drive to vary the operating speed of motor 24 in a manner which maintains the preselected maximum rod strain in either condition to minimize maintenance costs and power consumption associated with excessive strain.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A motor control system for a well pump system comprising:
   a support member;
   a rocking member having first and second ends and a center pivotally mounted on the support member;

a reciprocating member having first and second opposing ends, the first end operatively connected to the first end of the rocking member;

a down-hole pump connected to the second end of the reciprocating member;

a load cell operatively connected between the first and second opposing ends adjacent to the first end of the reciprocating member for producing dc signals indicative of actual loads being imposed on the reciprocating member during the return and pump stroke portions of an operating cycle;

a counterbalance crank operatively connected to the second end of the rocking member;

a motor operatively connected to the counterbalance crank for cycling the counterbalance crank through a reciprocating member return and pump stroke cycle; and a well pump control means operatively connected to the motor for varying the frequency of the voltage applied to the motor as a function of the difference between the dc signals of the load cell and a preselected compression level indicating dc signal during the rod return portion of the operating cycle, and as a function of the difference of the dc signals of the load cell and a preselected stress level indicating dc signal during the pump stroke portion of the operating cycle wherein the speed of the motor is quickly and smoothly varied for keeping the reciprocating member fully loaded, but not overstressed.

2. A motor control system for a well pump system comprising:

a support member;

a rocking member having first and second ends and a center pivotally mounted on the support member;

a reciprocating member having first and second opposing ends, the first end operatively connected to the first end of the rocking member;

a down-hole pump connected to the second end of the reciprocating member;

a load cell operatively connected between the first and second opposing ends adjacent to the first end of the reciprocating member for producing dc signals indicative of actual loads being imposed on the reciprocating member during the return and pump stroke portions of an operating cycle;

a counterbalance crank operatively connected to the second end of the rocking member;

a motor operatively connected to the counterbalance crank for cycling the counterbalance crank through a reciprocating member return and pump stroke cycle; and a well pump control means operatively connected to the motor for varying the frequency of the voltage applied to the motor as a function of the difference between the dc signals of the load cell and a preselected stress level indicating dc signal during the pump stroke portion of the operating cycle wherein the speed of the motor is quickly and smoothly varied for keeping the reciprocating member fully loaded, but not overstressed.

3. A motor control system according to claim 2 wherein the well pump control means includes an interface circuit means operatively connected to the load cell and a variable frequency drive connected to the interface circuit, said interface circuit including means for varying the frequency more or less rapidly in response to the load cell dc output wherein the variable frequency drive outputs motor drive frequencies as a function of rate of increase whereby when the reciprocating member is subjected to a sudden massive increase in strain the well pump control means reacts to slow the speed of the motor sufficiently to keep the stress on the reciprocating member within the stress limit of the reciprocating member.

* * * * *